UNITED STATES PATENT OFFICE.

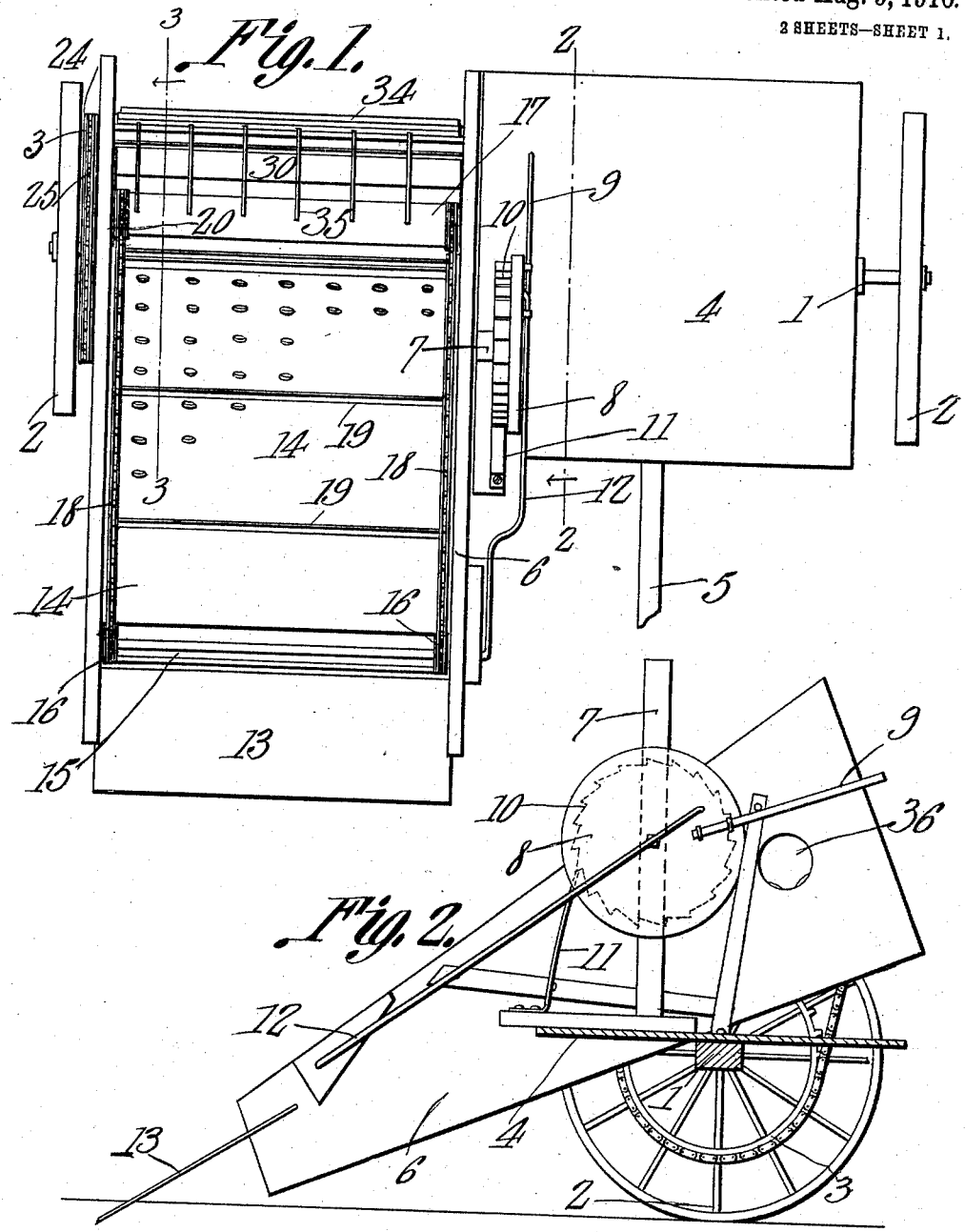

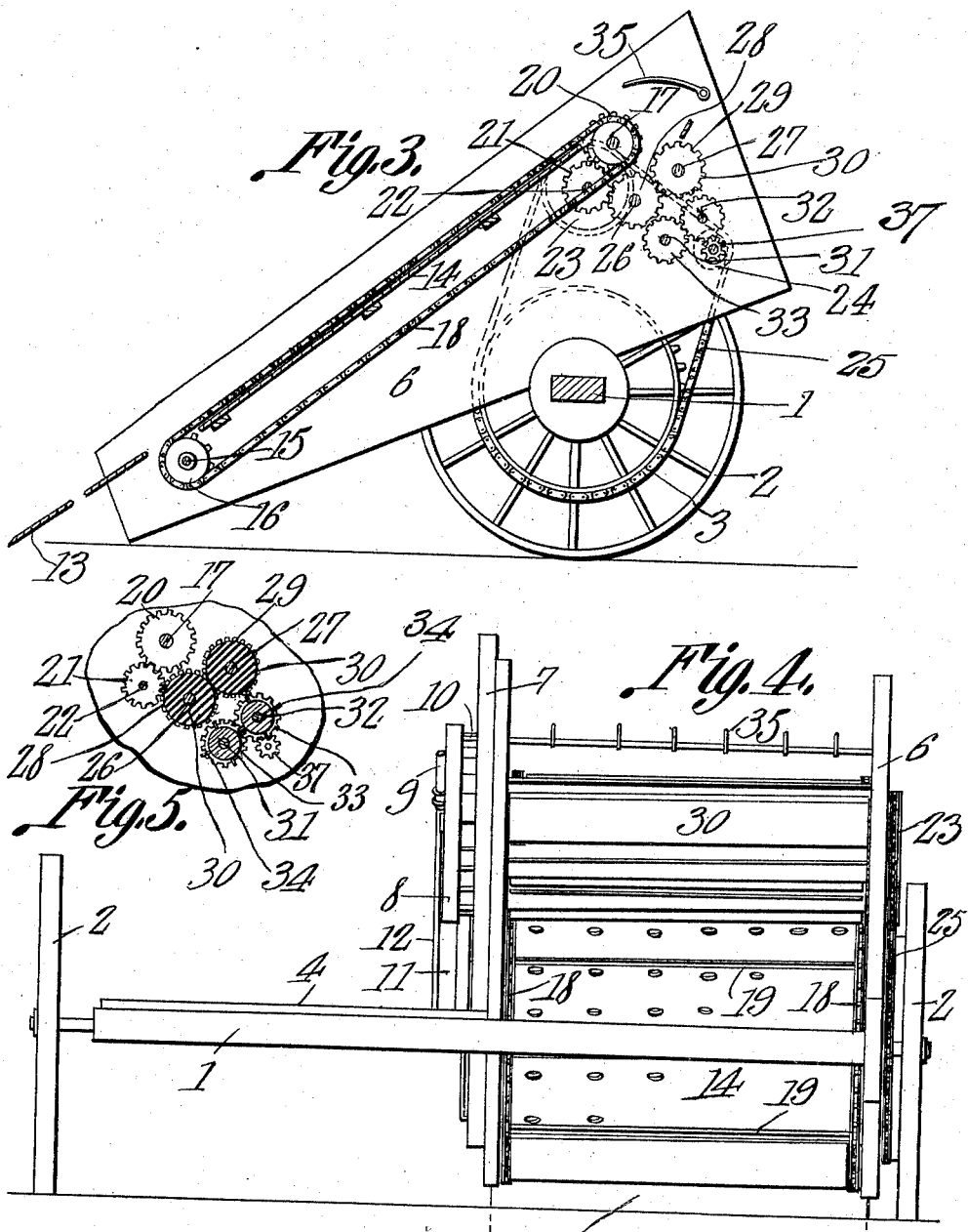

JOHN W. LINN AND THOMAS A. STUBBS, OF McGUFFEY, OHIO.

HARVESTER FOR ONIONS AND THE LIKE.

967,139.  Specification of Letters Patent.  Patented Aug. 9, 1910.

Application filed April 22, 1910. Serial No. 556,935.

*To all whom it may concern:*

Be it known that we, JOHN W. LINN and THOMAS A. STUBBS, citizens of the United States, residing at McGuffey, in the county of Hardin, State of Ohio, have invented a new and useful Harvester for Onions and the Like, of which the following is a specification.

This invention relates to a harvester for onions and the like and consists in the novel construction and arrangements of its parts as hereinafter shown and described.

The object of the invention is to provide a harvester of simple construction which is adapted to dig the onions from the soil and elevate the same in such manner that the soil is shaken or sifted from the crop.

A further object of the invention is to provide means for removing the tops or foliage from the unions and for directing the onions to a platform upon which may be mounted a receptacle. Also means are provided for separating weeds or other undesirable plants from the onions just prior to the time that the foliage is removed from the same.

In the accompanying drawings:—Figure 1 is a top plan view of the harvester. Fig. 2 is a vertical sectional view of the same cut on the line 2—2 of Fig. 1. Fig. 3 is a vertical sectional view of a portion of the harvester cut on the line 3—3 of Fig. 1. Fig. 4 is a rear end elevation of the harvester. Fig. 5 is a sectional view through the topping device of the harvester.

The harvester consists of an axle 1 mounted upon supporting wheels 2 one of which is provided with a gear rim 3. A platform 4 is mounted upon one portion of the axle 1, and a draft tongue 5 is connected at its rear end with the intermediate portion of the said axle. An elevator trunk 6 is pivotally mounted upon the axle 1 adjacent the platform 4. An upright 7 is mounted upon the platform 4 and a disk 8 is journaled upon the said upright. The said disk is provided with a radially disposed handle 9 and with a series of ratchet teeth 10 adapted to be engaged by a holding pawl 11 mounted upon the said platform 4. A rod 12 is pivotally connected at one end to the disk 8 and at its other end is pivotally connected to the lower forward portion of the trunk 6. By this arrangement of parts it will be seen that by swinging the handle 9 and partially rotating the disk 8 the rod 12 will be moved longitudinally and inasmuch as the trunk 6 is pivotally mounted upon the axle 1 the forward portion of the said trunk will be raised or lowered according to the direction in which the handle 9 is swung.

A digging share 13 is located at the lower forward portion of the trunk 6 and a sieve 14 is located between the sides of the said trunk behind and slightly below the rear edge of the share 13. A shaft 15 is journaled for rotation at its ends in the sides of the trunk 6 at the lower edge of the sieve 14 and is provided in the vicinity of its lower ends with sprocket wheels 16. A roller 17 is journaled at its ends between the sides of the trunk 6 in the vicinity of the upper end thereof and beyond the upper edge of the sieve 14 and chains 18 pass around the said roller 17 and the sprocket wheel 16 mounted upon the shaft 15. The chains 18 are connected together by cross slats 19 and the said chains and slats constitute an endless conveyer one run of which is located above the sieve 14 and the other run below the same. A gear wheel 20 is fixed to the shaft of the roller 17 and meshes with a gear wheel 21 fixed to a shaft 22 journaled in the side of the trunk 6. A sprocket wheel 23 is fixed to the outer end of the shaft 22 and a sprocket wheel 24 is journaled to the outer side of the trunk 6. A sprocket chain 25 passes around the sprocket rim 3, sprocket wheel 23 and sprocket wheel 24, and is adapted to transmit rotary motion from one of the supporting wheels 2 to the shaft 22 and through the intermeshing gear wheels 20, 21 to the roller 17. The roller actuates the conveyer as described. Shafts 26 and 27 are journaled for rotation in the sides of the trunk 6 and in the vicinity of the upper end thereof, the said shafts being located below the roller 17. The said shafts 26 and 27 are provided with intermeshing gear wheels 28 and 29 respectively and the gear wheel 28 meshes with the gear wheel 21 fixed to the shaft 22. Rollers 30 are carried by the shafts 26 and 27 and the said rollers are made of resilient material as for instance rubber. Shafts 31 and 32 are journaled for rotation below the shafts 26 and 27 and are provided with gear wheels 33 which intermesh with each other. The shafts 31 and 32 carry cutting knives 34. Fingers 35 are located in the upper rear portion of the trunk 6 above the delivery end of the conveyer. One of the wheels 33 meshes with a wheel 37 that is fixed with relation to the sprocket wheel 24.

From the above description it will be seen that as the harvester is drawn along the ground and the share 13 is permitted to pass below the surface of the soil the onions and a portion of the top soil will be lifted by the share and passed back upon the sieve 14 between the sides of the trunk 6. The material thus deposited is encountered by the slats 19 and carried along the said sieve and by this movement the earth and other granular matter are sifted from the onions and foliage. When the onions arrive at the delivery end of the conveyer which is just above the roller 17 they fall down upon the flexible rollers 30 and the foliage carried by the onions passes down between the rollers and from the rollers the said foliage is passed between the cutting knives 34 carried by the shafts 31 and 32. As the foliage passes between the said cutting knives it is severed and at the last cut the onion is drawn down in close contact with the peripheries of the rollers 30 but when the last section of the foliage is removed the onion will rebound and roll down along the rollers 30 toward an outlet 36 provided at the inner side of the conveyer trunk 6. A crate or other receptacle may be located upon the platform 4 below the opening 36 and as the onions are relieved of their tops they pass through the said opening into the said receptacle. Should the onions carry with them weeds or other objectionable plants, the said objectionable plants will be engaged by the fingers 35 and directed over and rearwardly beyond the rollers 30 without encountering the same. By reason of the fact that the said rollers 30 are composed of resilient material they will not bruise or otherwise damage the onions.

Having described the invention, what is claimed is:—

1. A harvester comprising a wheel mounted frame, an elevator trunk located upon the frame, a digging share located in advance of the elevator trunk, a conveyer mounted for movement along the trunk, a sieve located between the upper and lower runs of said conveyer, resilient rollers journaled for rotation below the delivery end of the conveyer and cutting knives journaled for rotation below the rollers and means for operating the operable parts from one of the supporting wheels of the harvester.

2. A harvester comprising a wheel mounted frame, an elevator trunk mounted upon the frame, a digging share located in advance of the trunk, an endless conveyer mounted for movement along the trunk, a sieve located between the runs of said conveyer, resilient rollers journaled for rotation below the delivery end of the conveyer, cutting blades journaled for rotation below said resilient rollers, weed lifting fingers carried by the trunk and located above the delivery end of the conveyer and means for operating the conveyer, the resilient rollers and the cutting blades from one of the supporting wheels of the harvester.

In testimony that we claim the foregoing as our own, we have hereto affixed our signatures in the presence of two witnesses.

JOHN W. LINN.
THOMAS A. STUBBS.

Witnesses:
 DELL ELLIS,
 CHARLES NEWLAND.